No. 669,278. Patented Mar. 5, 1901.
L. J. BREHM.
RAIN WATER FILTER.
(Application filed Oct. 6, 1900.)

(No Model.)

Witnesses:
Geo. W. Young.
Chas. L. Goss.

Inventor:
Leonard J. Brehm,
By Winkler, Flanders, Smith, Bottum & Vilas
Attorneys.

UNITED STATES PATENT OFFICE.

LEONARD J. BREHM, OF BURLINGTON, WISCONSIN, ASSIGNOR OF ONE-THIRD TO WILLIAM P. COLBURN, OF SAME PLACE.

RAIN-WATER FILTER.

SPECIFICATION forming part of Letters Patent No. 669,278, dated March 5, 1901.

Application filed October 6, 1900. Serial No. 32,217. (No model.)

*To all whom it may concern:*

Be it known that I, LEONARD J. BREHM, a citizen of the United States, residing at Burlington, in the county of Racine and State of Wisconsin, have invented certain new and useful Improvements in Rain-Water Filters, of which the following is a specification, reference being had to the accompanying drawings, forming a part thereof.

My invention relates to devices for removing leaves, sticks, and other refuse matter from rain-water in its passage from the gutters or eaves-troughs in which it is caught to the cisterns or reservoirs in which it is stored. Its main object is to provide a strainer that is simple and economical in construction and effective in operation and that can be easily cleaned without disturbing its inlet and outlet connections.

It consists in certain novel features in construction and arrangement and in the combination of parts, as hereinafter particularly described, and pointed out in the claims.

In the accompanying drawings like letters designate the same parts in both figures.

Figure 1:
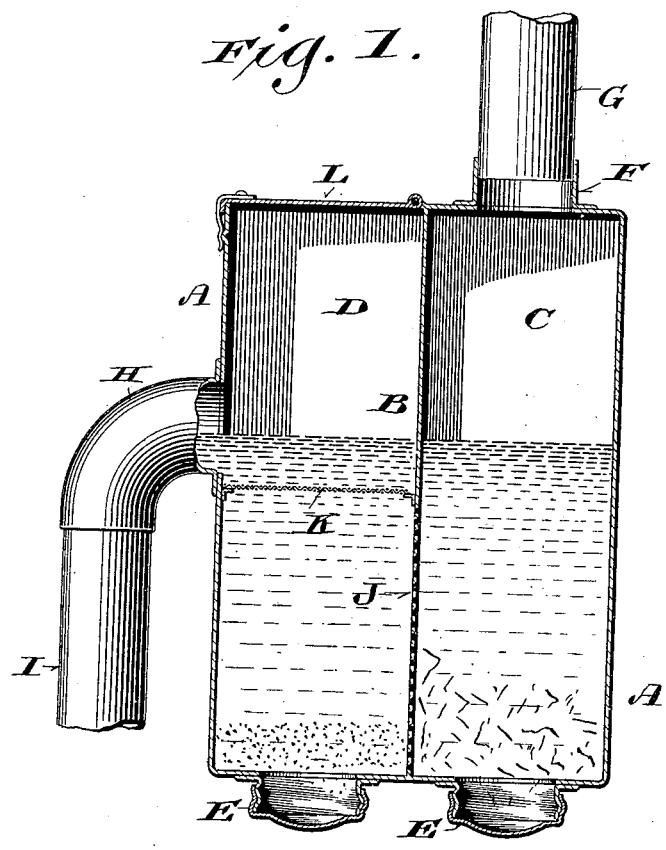
Figure 2:
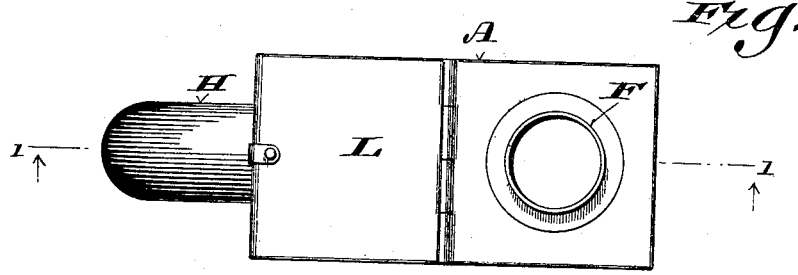

Figure 1 is a vertical section on the line 1 1, Fig. 2, of a strainer embodying my improvements; and Fig. 2 is a plan view of the same.

A is a casing, which may be made of sheet metal, such as tin or galvanized iron, and is preferably of rectangular form. It is divided by a vertical partition B into two chambers C and D and is provided at the bottom with clean-out openings communicating with said chambers and with screw-caps E E or other suitable closures for said openings. The chamber C is provided at the top with an inlet connection F, to which the conductor G, leading from a gutter or eaves-trough, is attached, and the chamber D is provided on one side, preferably the side opposite the partition B, with an outlet connection H, to which the conductor I, leading to the cistern or reservoir, is attached.

The lower part of the partition B consists of or is provided with a coarse strainer J to prevent the passage of the coarser refuse carried with the rain-water into the chamber C from passing into the chamber D. This strainer may be conveniently made by coarsely perforating the lower part of the partition B.

K is a finer strainer arranged horizontally across the chamber D, between the coarse strainer J and the outlet H, and dividing said chamber into upper and lower compartments. This strainer K is preferably made of wirecloth and may be removable, so as to be more readily and conveniently renewed and cleaned.

The top of the casing is provided with a door L or removable section, by means of which access is had to the chamber D for cleaning or removing the strainer K.

In the operation of the strainer the water enters the top of chamber C and passes from the lower part of said chamber into the lower part of the adjoining chamber D through the coarse strainer J. The coarser refuse matter is thus caught and allowed to settle in the bottom of chamber C. From the lower compartment of chamber D the water freed from the coarser refuse flows upwardly into the upper compartment through the strainer K. The finer impurities are thus retained in the lower compartment in which they are allowed to settle, and the clarified water flows from the upper compartment into the outlet connection H.

The device being located in an accessible position the refuse and sediment collected at the bottom of chambers C and D are removed from time to time through the clean-out openings, and the strainers J and K are reached and cleaned through said openings and the door L at the top of chamber D.

The chambers C and D being larger in cross-section than the cross-sectional area of the conductor-pipes G and I, the flow of water through said chambers is more or less retarded, and the refuse and impurities contained therein are allowed to settle.

The chamber D or the lower compartment thereof may be made of comparatively larger cross-sectional area than the chamber C, so that the water after passing through the coarse strainer J will be still further checked in its flow and a better opportunity allowed for the finer refuse or impurities to settle.

The size and relative proportions of the chambers and compartments of the strainer and the details of construction may be varied without departing from the principle and intended scope of the invention.

I claim—

1. A rain-water filter consisting of a casing divided by a vertical partition into two chambers, one of which has an inlet connection at the top and the other an outlet connection at one side, a coarse strainer in the lower part of said partition, and a fine strainer arranged across one of said compartments between the coarse strainer and the outlet connection, substantially as and for the purposes set forth.

2. A rain-water strainer, consisting of a casing divided by an upright partition into two chambers, one of which has an inlet connection at the upper end and the other an outlet connection in one side, and each provided at the bottom with a clean-out opening and closure, a coarse strainer in the lower part of said partition, a finer strainer arranged across one of said chambers between the coarse strainer and the outlet connection, substantially as and for the purposes set forth.

3. In a rain-water filter, the combination of a casing divided by a vertical partition into two chambers, one of which has an inlet connection at the top and the other an outlet connection on one side, and each of which is provided at the bottom with a clean-out opening and a closure therefor, a coarse strainer in the lower part of said partition, a finer strainer extending across one chamber between the coarse strainer and the outlet connection and separating said chamber into two compartments, one above the other, and a clean-out opening and cover therefor at the top of said upper compartment, substantially as and for the purposes set forth.

4. In a rain-water strainer, the combination of a casing divided by an upright partition into two chambers, one of which has an inlet connection at the top and the other an outlet connection on one side, and each of which has a clean-out opening in the bottom and a screw-cap for closing the same, a coarse strainer in the lower part of said partition, a finer strainer extending across one of said chambers between the coarse strainer and the outlet connection and dividing said chamber into upper and lower compartments, and a hinged door for opening and closing the top of said upper compartment, substantially as and for the purposes set forth.

In witness whereof I hereto affix my signature in presence of two witnesses.

LEONARD J. BREHM.

Witnesses:
W. H. BUSHMAN,
LOUIS PLATE.